(No Model.) 2 Sheets—Sheet 1.

J. P. SCHURKENS.
CORN HUSKER.

No. 519,929. Patented May 15, 1894.

WITNESSES:
H. Walker
C. Sedgwick

INVENTOR
J. P. Schurkens
BY
Munn & Co.
ATTORNEYS.

THE NATIONAL LITHOGRAPHING COMPANY,
WASHINGTON, D. C.

(No Model.) 2 Sheets—Sheet 2.
J. P. SCHURKENS.
CORN HUSKER.
No. 519,929. Patented May 15, 1894.
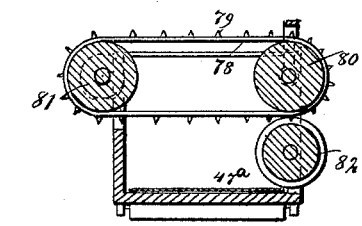
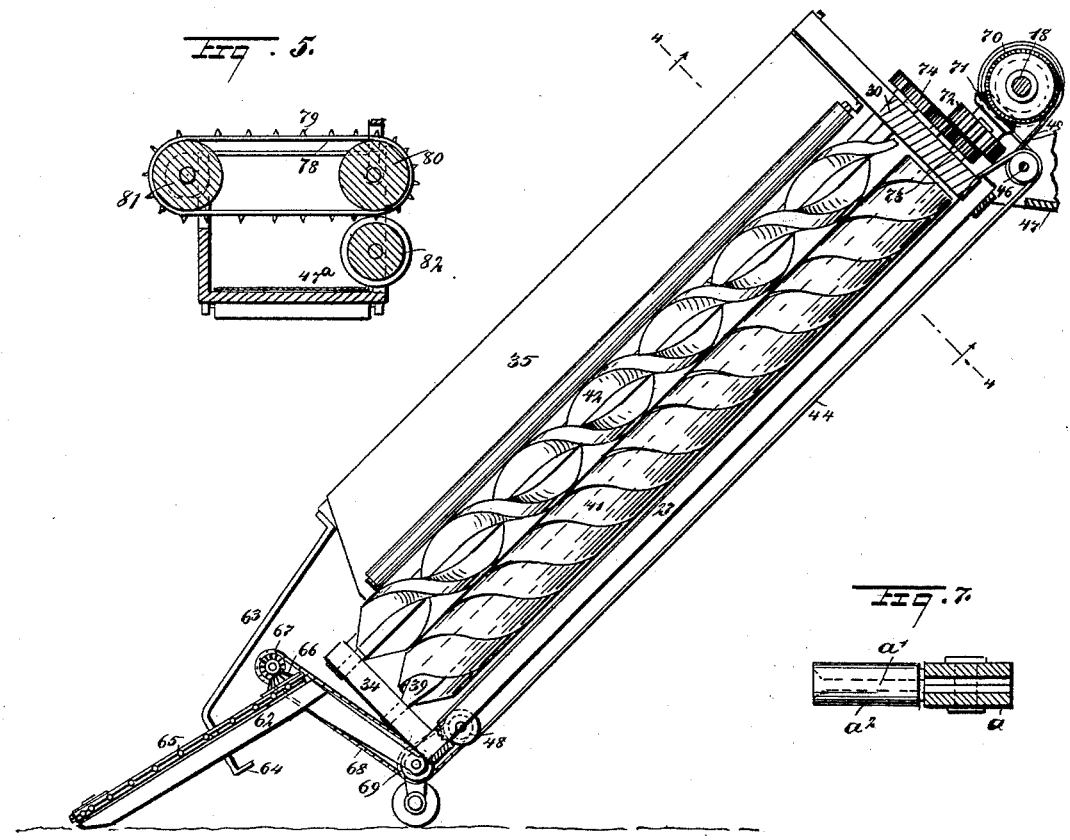
WITNESSES:
H. Walker
C. Sedgwick
INVENTOR
J. P. Schurkens
BY
Munn & Co
ATTORNEYS.

UNITED STATES PATENT OFFICE.

JOHN P. SCHURKENS, OF WESTPHALIA, KANSAS.

CORN-HUSKER.

SPECIFICATION forming part of Letters Patent No. 519,929, dated May 15, 1894.

Application filed May 10, 1893. Serial No. 473,683. (No model.)

*To all whom it may concern:*

Be it known that I, JOHN P. SCHURKENS, of Westphalia, in the county of Anderson and State of Kansas, have invented a new and Improved Corn-Husker, of which the following is a full, clear, and exact description.

My invention relates to an improvement in corn huskers, and it has for its object to provide a machine capable of being driven along a corn field, and which will remove the ears simultaneously from two rows of standing corn, and so manipulate the ears that the husks will be removed therefrom before the ears leave the machine, and without injury to the ears.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
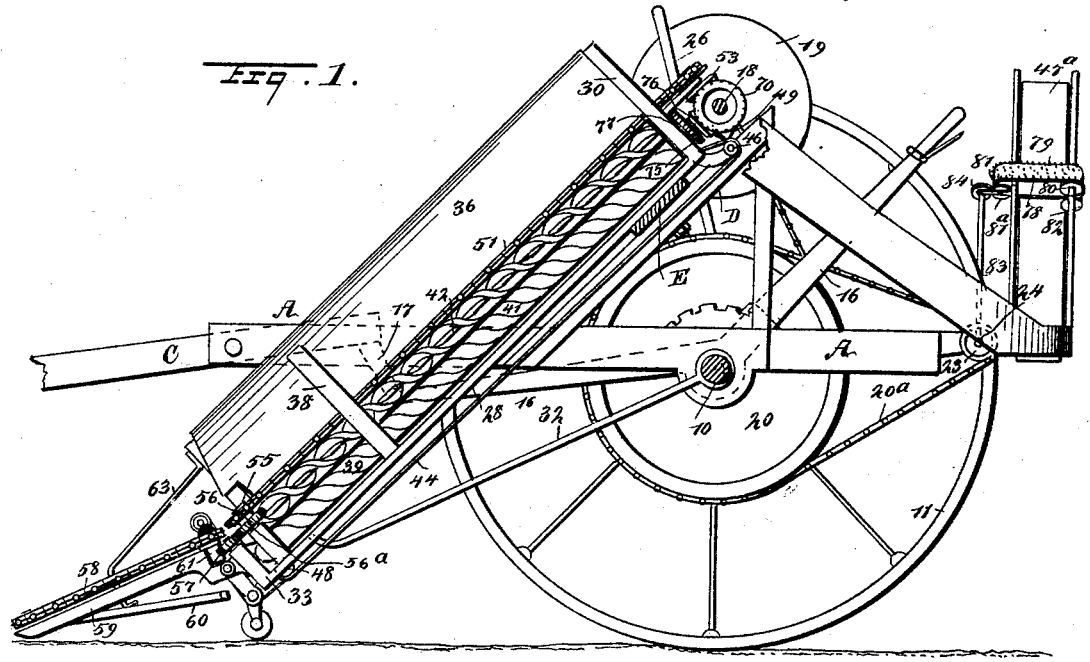
Figure 2:
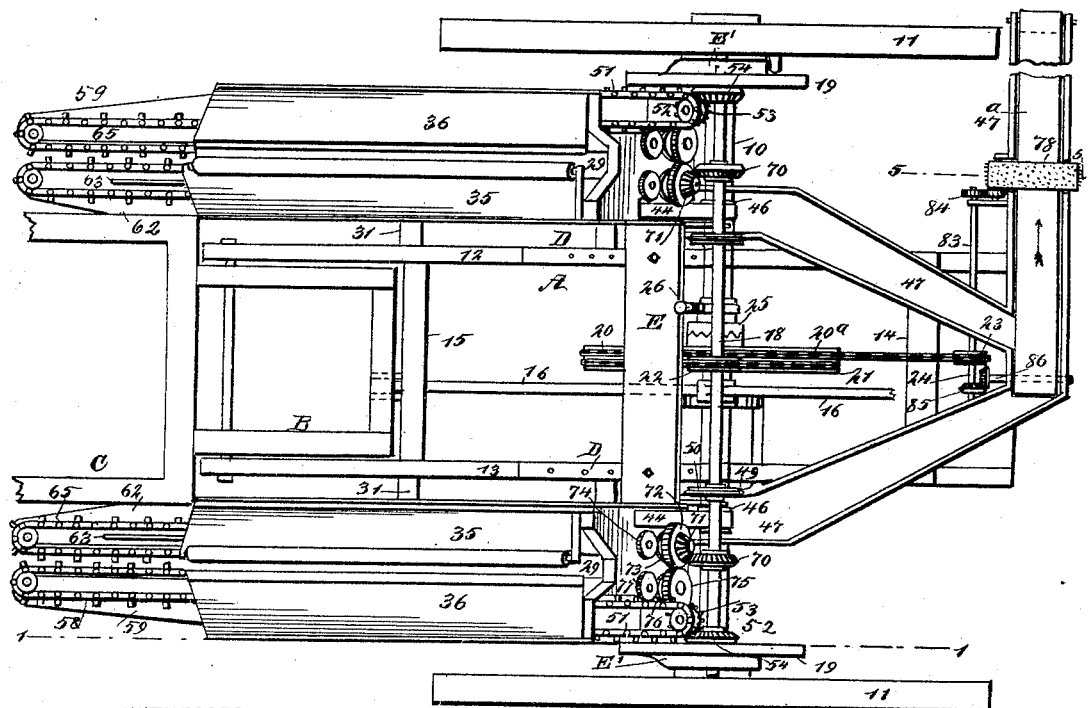

Figure 1 is a vertical section taken essentially on the line 1—1 of Fig. 2. Fig. 2 is a plan view of the machine. Fig. 3 is a vertical central section through one of the husking and ear removing devices, said section being taken practically on the line 3—3 of Fig. 4. Fig. 4 is a transverse section through a corn husker and ear removing device, the section being taken practically on the line 4—4 of Fig. 3. Fig. 5 is a transverse section through one of the delivery chutes, the section being taken essentially on the line 5—5 of Fig. 2. Fig. 6 is a detail side elevation of what I term the husking roller. Fig. 7 is a detail view of a link of one of the guide chains and Figs. 8 and 9 are detail views showing one of the spring pressed bearings of the pressure roller.

In carrying out the invention a rectangular frame A, is pivotally mounted upon an axle 10, the axle being provided at its ends with supporting wheels 11, which wheels are connected with the axle through any approved clutch mechanism, or by means of ratchets and pawls. The frame comprises a body section, which is immediately over the axle, the side bars of the frame being designated as 12 and 13, and the body of the frame extends beyond both the front and the rear of the axle, and at the rear of the frame a cross bar 14, is located, and near the forward end of the frame a like bar 15, is placed. The side bars 12 and 13 extend forwardly beyond the front cross bar, and between the projecting ends of the side bars and the cross bar of the frame, the rear frame extension B, of the shaft C, is pivoted, as the machine is preferably adapted to be drawn by a single horse.

The husking and ear-removing mechanism of the machine is made to approach the ground more or less closely, by manipulating the rear extension B of the shafts, and in order that such manipulation may be readily accomplished a lever 16, provided with a suitable rack, is preferably mounted upon the axle 10, which lever is connected by a link 17, or otherwise, with the said shaft extension frame B, as shown in Fig. 2. The construction of the frame is completed by the addition of standards D, to the body at its sides, the forward faces of which standards are forwardly and downwardly inclined, and the inclined members are provided with a series of apertures, as shown best in Fig. 2, in order that a beam E may be adjustably supported upon said members, by passing bolts or equivalent fastening devices through the beam and through the said inclined members of the standards. The beam E, is usually provided at its ends with upwardly and rearwardly - extending arms E', and in these arms a line shaft 18, is journaled, the said line shaft being provided with a balance wheel 19 at each end.

The driving power, as has heretofore been stated, is derived from the axle, and to that end the axle at its center is provided with a large gear 20, preferably a sprocket wheel, and the said wheel is fitted to receive two belts, one belt 21, being passed upward over a sprocket pinion 22, located upon the line shaft 18, while the other belt 20$^a$ is passed rearward to a sprocket pinion 23, located upon a short shaft 24, journaled in an extension at the central rear portion of the frame A, as is best shown in Fig. 2; and the driving gear 20, is loosely mounted upon the axle, and is provided with a clutch face adapted for engagement with a clutch 25, held to slide upon and turn with the axle, the clutch being operated by a suitable shifting lever 26.

Two devices adapted for removing the ears from the standing corn and removing the husks from the ears, are employed in connection with the machine, one of the devices being located at each side of the frame A; and as these devices are identical in construction the especial construction of but one of them will be described. Both of the devices are attached at their upper ends to the beam E, and extend downwardly and forwardly in direction of the ground. The body of the husking and gathering device for the ears consists of two bottom boards 27 and 28, as is best shown in Fig. 4, which boards are located a slight distance apart, forming thereby a central opening 29, which opening extends the length of the casing with the exception of at the top, as the top end is closed by an end board 30, the said board being attached to each of the bottom boards or sections 27 and 28. As has heretofore been stated the casing or boxing is secured to the beam E, and it is attached to said beam at its upper end, and the inner bottom board also rests upon a block 31, attached to one side of the frame, and as an additional support for the casing a rod 32, is connected with the axle and with the lower portion of the outer board 28 of the casing, the lower end of the rod having sliding movement in said board to admit of the casing being raised or lowered at its lower extremity. Each bottom board or section 27 and 28 at its lower end is provided with an upright, the upright of the outer board 28, being designated as 33 and is shown best in Fig. 1, while the corresponding board for the inner section is designated as 34, and is shown best in Fig. 3. The casing is completed by two upper guide boards 35 and 36; the guide board 35, has a hinged connection with the upper inner edge of an inner side board 37, which is secured at its lower end to the inner bottom board 27, and the upper end board 30, is provided with a V-recess, and the guide board 35, rests normally upon the inclined surface forming one side of the recess, as shown in Fig. 4. The guide board 36, is attached to standards 38, projected upward from the outer bottom board 28, and the said board likewise rests upon one of the inclined walls of the upper end board 30, as is likewise shown in Fig. 4; the opening between the lower ends of the two guide boards 35 and 36, is in alignment with the opening between the bottom boards 27 and 28, and the corn stalks to be operated upon pass in standing position upward through these two openings.

From the foregoing description it will be observed that the outer side of the boxing or casing is comparatively open, and this feature is also shown in Fig. 1, in which the boxing or casing is shown in side elevation.

Within the boxing or casing two snapping rollers are longitudinally journaled, designated respectively as 39 and 40. These rollers are located slightly above the bottom of the casing, and are practically in contact throughout their length, and one roller is journaled at each side of the bottom opening 29 in the casing, as shown best in Fig. 4. These snapping rollers are adapted to pull or break off the ears from the standing corn, and their construction is very peculiar. One of them is shown in side elevation in Fig. 3, and both of them in cross section in Fig. 4.

The rollers are constructed in the following manner: Preferably four spiral grooves are made longitudinally in the core or body of the roller from end to end thereof, and four plates of steel or other spring metal are employed, the plates being of a predetermined width and length, and the edges of these plates, which are quite thin, are placed in the spiral grooves and are fastened therein. Thus the plates are spirally located upon the body of the roller, one overlapping the other with a space intervening them. In side elevation they represent a volute spiral, and in cross section the roller appears as consisting of a body and a series of curved arms radiating therefrom, the arms being curved in the same direction, and the snapping rollers are so placed that the spring arms or plates 41 carried thereby, will contact as the rollers revolve, and as the spring arms or plates are of a yielding character they will hold small as well as large objects placed between them. The rollers are adapted to revolve in opposite directions and at such a rate of speed as will enable them to take in about one foot of stalk between them for every one foot of ground over which the machine passes.

Above the outer snapping roller a deflecting roller 42, is journaled in the casing or boxing, longitudinally thereof. This deflecting roller is shaped exteriorly similar to an auger, comprising a body and a series of spiral ribs extending from end to end thereof, as shown in Fig. 3.

Horizontally opposite the deflecting roller, and vertically above the inner snapping roller, the husking roller 43, is journaled longitudinally in the casing. This roller is shown in detail in Fig. 6 and in cross section in Fig. 4, and comprises a body 43$^a$, and series of arms 43$^b$ which radiate from the body, the arms being located in circumferentially arranged groups, the groups being at intervals apart. The arms are curved preferably in the same direction, and are of a spring material, for example spring wire, or spring rods, and the extremities of the arms are bent at an angle to the body, some in one direction and some in another direction, forming thereby hooks adapted to strip the husks from the ears of corn as said ears are presented to said rollers.

The husking roller is adapted to rotate about twice as fast as the snapping rollers. The speed of the deflecting roller may be regulated as found desirable. A conveyer belt 44, is made to pass over and under the inner bottom section of the casing alongside the inner surface of the inner snapping roller, and this conveyer belt passes out through a suitable opening in the upper end board 30, the opening being designated in Fig. 4 as 45, and over a pulley 46, said pulley being journaled in the forward end of the delivery chute 47, and the said chute is supported upon the rear extension of the body, the chute being downwardly inclined. The chute is inclined inward as well as downward, and is preferably made contracted at its delivery end. The chutes from each side of the machine connect with an elevator 47$^a$, and said elevator extends upward and in direction of and beyond one side of the machine.

The conveyer belt 44, at its lower end, is passed over a pulley 48, journaled in an opening produced in the inner bottom board of the casing near its lower end. The conveyer belt 44, is driven by rotating the shaft upon which the pulley 46, is located, and this is accomplished by placing upon the said shaft a second pulley and connecting the pulley by a driving belt 49 with a pulley 50, located on the line shaft 18.

Within the casing at the outer side thereof and over the deflecting roller, a guide belt 51, is located. The belt is endless, and it is adapted to force the stalks of corn to stand in proper position with relation to the husking roller; that is to say, the belt 51, is intended to give the ears of corn an inclination in direction of the inner side of the casing. The guide belt is passed around a pulley 52, journaled in an opening in the upper end of the casing, and upon the same shaft with the pulley 52, which is preferably a sprocket wheel, a gear 53, is located, as shown best in Fig. 2, and the gear, which is ordinarily a beveled pinion, is made to mesh with a beveled gear 54 upon the line shaft 18. In this manner the guide belt is rotated from the line shaft, and the lower portion of the guide belt, which runs parallel with the deflecting roller, passes over a sprocket wheel 55, secured upon a vertical shaft, the said shaft being journaled on an upright 56, located upon the outer bottom section 28, as shown in Fig. 1. Upon this same shaft a gear 56$^a$, is located, which meshes with a second gear 57, the latter gear being located upon the upper end of the front board 33 of the casing, as likewise shown in Fig. 1. The gear 57, is adapted to drive a feed belt 58, and the feed belt is endless, and is located upon the top of a guide finger 59, the belt passing over suitable sprocket wheels located at the ends of the finger. The finger 59, is hinged at the lower portion of its forward end to the front board 33 of the casing, and is therefore located at the outer side of the bottom casing opening 29. The finger extends downward and is adapted to engage with the ground at its lower edge, or practically so, and is prevented from dropping too far by means of a brace 60, secured upon its under surface and adapted to engage with the front board 33, or any adjacent support.

As the guide finger 59, is to be raised and lowered to accommodate itself to inequalities of the ground, for example, it is necessary that the gear by means of which the feed belt 58, is revolved should have more or less vertical play; therefore, upon the same trunnion on which the upper sprocket wheel of the belt is located a long gear 61, is placed, as shown in Fig. 1, and this gear meshes with the gear 57 upon the front board 33 heretofore alluded to. A second guide finger 62, is employed, located at the inner side of the bottom opening 29 at the lower end of the casing. The second guide finger 62, is best shown in Fig. 3, in which it is illustrated as of angular construction, its vertical or shorter member being hinged to the bottom board 27 of the casing, and this finger is supported so as to have more or less vertical play preferably through the medium of a guide rod 63, attached to the lower end of the hinged guide board 35, the rod passing loosely through the finger some distance, and it is made to terminate in a head 64 at its lower end, as is likewise best shown in Fig. 3. An endless feed belt 65, is located over the finger 62, passing around suitable sprocket gears journaled at the ends of the upper section of the finger, and this belt is ordinarily driven by connecting with the upper sprocket wheel a beveled gear 66, which meshes with a like gear 67, the said gear being provided with an attached pulley connected by a belt 68 with a pulley 69, driven from the lower roller of the conveyer 44. But I desire it to be distinctly understood that different gearing may be employed to operate the feed belts if in practice it is found desirable.

The standing corn passes upward between the feed belts, and is directed by the said belts into the central opening of the casing in which the husking and gathering mechanism is located. The links of the feed belts as likewise the links of the guide belt 51, are of like construction, and are shown in detail in Fig. 7, in which it will be observed that each link $a$ of the chain is provided with a pin $a'$, projected outwardly from it, and upon this pin a roller $a^2$, is located. The rollers, as shown in Fig. 2, are at the outer edges of the belts, and consequently engage with the corn, and having a rolling contact with the stalks serve to guide them with less friction and with more surety than could otherwise be attained.

The deflecting and husking or snapping rollers are revolved from the line shaft 18 in the following manner: A beveled gear 70, is mounted upon the line shaft, and meshes with a beveled pinion 71, attached to the upper end of the axle of the inner snapping roller 40; and upon the same end of the roller a gear 72, is secured and a pinion 73. The pinion 73, meshes with the pinion 74, located upon the upper end of the husking roller shaft, as shown best in Fig. 2, and the gear 72, meshes with a gear 75, which is fast upon the upper end of the shaft of the snapping roller 39, which shaft likewise carries a pinion 76, and that pinion meshes with a pinion 77, located upon the upper end of the deflecting roller shaft. Thus all of the rollers employed for husking and gathering the ears of corn are driven directly from the line shaft.

It frequently happens that all of the husks are not removed from the ears of corn by the husking roller, and that more or less silk will adhere to the grain. It is desirable that the ears of corn should be delivered from the machine as clean as possible, and to that end an auxiliary husking device is employed which consists in an endless belt 78, located transversely over the elevator 47ª at any convenient point, which belt is provided with a series of spurs or teeth 79, as shown in Fig. 5, arranged over almost the entire portion of its outer face. This belt passes over two rollers 80 and 81, journaled preferably in fixed bearings located in the sides of the elevator, and the roller 81, is provided with an attached gear 81ª, while the roller 80 has journaled beneath it a second roller 82, the bearings of which are preferably spring pressed, and are located in a side portion of the elevator as clearly shown in Figs. 8 and 9, and this roller is grooved to admit of the passage of the teeth or spurs 79, and a portion of both the rollers 80 and 82 is within the elevator. Thus it will be observed that when the ears of corn are delivered by the conveyer 44 into the chute 47 and pass to the elevator 47ª, they will be compelled to pass beneath the scraping belt 78, which will remove whatever husk or silk may still adhere to the ears. The material removed will be carried by the belt over the lower roller 82, which may be termed a pressure roller and out from the elevator. The ears of corn are thus delivered very clean from the elevator into a wagon or other vehicle or receptacle located beneath the delivery end of the elevator. The roller 81 is the driven roller and one manner of driving it is shown in Fig. 2, in which a shaft 83, is journaled in suitable bearings parallel with one side of the elevator. The shaft 83, is driven from the shaft 24, located between the chutes, or may constitute a continuation of the shaft 24. The upper end of the shaft 83 carries a gear 84, which meshes with the gear of the scraping belt 78, and the elevator is driven by placing a gear 85 upon the shaft 24, best shown in Fig. 2, and meshing it with a gear 86 upon the lower drum shaft of the elevator.

Thus in the operation of this machine, as it is drawn forward over a field of corn, the corn stalks of two opposite rows will be received between the guide fingers 59 and 62 at each side of the machine, and the feed belts carried by the fingers will cause the stalks to be guided into the central opening of the casing containing the husking and removing mechanism. A stalk will be grasped by the snapping rollers, and as the stalk is carried upward between said rollers, the machine meanwhile advancing, the deflecting roller will force the ear over in direction of the husking roller, and the husking roller coming in engagement with the ears will by means of its teeth 43ᵇ strip the husk more or less from the ear, and the ear upon being grasped by the snapping rollers will be broken or pulled from the stalk and delivered to the conveyer 44. The conveyer will deliver the ears into the elevator 47ª, whereupon the stripping belt 78, will act upon the ears of corn as they are passed beneath them and any silk or husk that may adhere to the corn will be removed.

It will be observed that owing to the spring arms or plates 41 of the snapping rollers, which are in the same vertical plane as the stalks, the rollers may receive between them articles of various thicknesses without injury to the said articles or injury to themselves, and will therefore remove from the stalk the smallest ear with as much facility as the largest one. The machine is quite simple in its construction, is exceedingly durable and economic, and as has heretofore been stated, will remove the ears from standing corn, leaving the stalks with their roots in the ground, the ears of corn only being removed.

I desire it to be understood that the stalks and blades of corn standing upright between the guide boards and adjacent to the ribs of the deflecting roller 42, will not be subjected to the action of the husking roller 43, as the deflecting roller will only deflect the ears at their larger ends while their smaller ends are still arrested between the lower edges of the guide boards 35 and 36. In this manner the snapping off of the ears is greatly facilitated, as the ears are at the same time drawn downward upon the snapping rollers. The guide boards tend to turn the hanging ears and cause them as well as all of the corn stalks to pass through between their lower edges, the larger ends of the ears being first entered. It will thus be seen that the snapping of the ears is effected by the combined action of the fingers of the guiding chain 51, the deflecting roller 42 and the snapping rollers 39 and 40, and that the ears are made to snap comparatively easily by reason of their husks having been opened by the husking roller 43 previous to their being subjected to the snapping operation.

Having thus described my invention, I claim as new and desire to secure by Letters Patent—

1. In a corn-husking machine, snapping rollers arranged in parallel planes and provided with spiral wings or plates of a yielding substance, the rollers being adapted to revolve substantially in engagement, a deflecting roller located above one of the snapping rollers, and a stripping or husking roller located above the other snapping roller, the deflecting roller serving to guide the stalks of corn to the snapping and stripping rollers, the stripping rollers serving to remove the husk and the snapping rollers to break the ears from the stalk, substantially as shown and described.

2. In a machine of the character described, the combination, with a casing having a central longitudinal opening and a conveyer located therein, of snapping rollers adapted to remove the ears of corn from their stalks, said rollers having a yielding roughened face and revolving substantially in contact, a deflecting roller located above one of the snapping rollers, of substantially auger-like construction, and a stripping or husking roller located above the other snapping roller, the stripping or husking roller being provided with a series of curved teeth radiating therefrom, as and for the purpose specified.

3. In a machine of the character described, the combination, with a casing having an opening extending through from top to bottom, a conveyer located within the casing near one side, and an endless guide chain located within the casing near the opposite side, of snapping rollers adapted to break the ears of corn from their stalks, the said rollers being arranged one at each side of the opening and being provided with a yielding and spirally roughened exterior surface, a deflecting roller of essentially screw or auger-like construction located between one snapping roller and the guide belt, and a stripping or husking roller located opposite the deflecting roller and over the second snapping roller, the husking or stripping roller comprising a body and curved arms radiating from the body, said arms being provided with hook-like extremities, as and for the purpose set forth.

4. In a husking machine, the combination, with an elevator adapted to receive ears of corn, of an endless belt extending transversely over the elevator and provided with a series of teeth or spurs upon its outer face, adapted to engage the ears of corn and remove the covering therefrom, and a delivering device acting in conjunction with the belt to pass the material removed from the elevator, substantially as shown and described.

5. In a corn husking machine, the combination, with an elevator adapted to receive and deliver ears of corn, of an endless belt extending over the elevator and provided with exteriorly located spurs or teeth, a pressure roller revolving in contact with the belt, adapted to deliver material removed from the ears of corn out from the elevator, and a driving mechanism, substantially as shown and described, connected with the belt supports, as and for the purpose specified.

6. In a corn husking machine, a guide or feed belt, the same being constructed of a series of connected links, pins projected outwardly from the links, and rollers carried by the pins, as and for the purpose specified.

7. In a corn husking machine, the combination, with a casing having an opening extending through from top to bottom, a conveyer belt located within the casing near one side, and a guide belt located near the opposite side, of snapping rollers adapted to remove the ears of corn from their stalks, said rollers being arranged one at each side of the bottom opening in the casing, consisting each of a body and plates of a spring material spirally arranged upon the body, one plate overlapping the other, a deflecting roller of exterior screw or auger shape located between one of the snapping rollers and the guide belt, a stripping or husking roller located over the opposite snapping roller, and consisting of a body and curved spring fingers radiating therefrom, guide fingers pivotally connected with one end of the casing, one at each side of its bottom opening, feed belts carried by the guide fingers, rollers projected from the outer sides of the feed belts and guide belt, and a driving mechanism whereby the rollers and belts are simultaneously driven, as and for the purpose set forth.

JOHN P. SCHURKENS.

Witnesses:
J. C. MERRILL,
BARNEY LAW.